United States Patent [19]

Tak

[11] 4,297,605

[45] Oct. 27, 1981

[54] BRUSH ASSEMBLIES FOR ELECTRIC MOTORS OR GENERATORS

[75] Inventor: Shiu M. Tak, Kowloon, Hong Kong

[73] Assignee: Wah Ming Electrics Limited, Kowloon, Hong Kong

[21] Appl. No.: 114,317

[22] Filed: Jan. 22, 1980

[30] Foreign Application Priority Data

Oct. 30, 1979 [GB] United Kingdom ............... 37524/79

[51] Int. Cl.$^3$ ............................................. H02K 13/00

[52] U.S. Cl. ...................................... 310/242; 310/245

[58] Field of Search ............... 310/238, 239, 240, 241, 310/242, 245, 246, 247, 233

[56] References Cited

U.S. PATENT DOCUMENTS

| | | | |
|---|---|---|---|
| 3,112,419 | 11/1963 | Dobslaw | 310/239 |
| 3,339,098 | 8/1967 | Burrows | 310/239 |
| 3,480,814 | 11/1969 | Amrein | 310/247 |
| 3,513,343 | 5/1970 | Harvey | 310/242 |
| 3,534,206 | 10/1970 | Carey | 310/247 |
| 3,955,113 | 5/1976 | Hillyer | 310/245 |
| 4,075,523 | 2/1978 | Lafferty | 310/239 |

*Primary Examiner*—R. Skudy

*Attorney, Agent, or Firm*—Cushman, Darby & Cushman

[57] ABSTRACT

A brush assembly for a motor or generator includes a brush, a holder, a spring for using the brush out of the holder, and a restraining washer between the spring and brush. The restraining washer prevents the spring from coming into contact with the commutator of a motor or generator when the brush has worn away.

4 Claims, 2 Drawing Figures

BRUSH ASSEMBLIES FOR ELECTRIC MOTORS OR GENERATORS

The present invention relates to brush assemblies for electric motors or generators, for instance, carbon brush assemblies for AC motors.

According to one aspect of the invention, there is provided a brush assembly for an electric motor or generator, comprising a brush, a holder, resilient means for urging the brush out of the holder, and restraining means for preventing the resilient means from contacting a commutator of the motor or generator, when the assembly is mounted thereon, when the brush has worn away.

The restraining means may comprise a washer interposed between the brush and the reslient means and arranged, when the brush has worn away, to abut against the edge of an opening in the holder through which the brush is urged.

The resilient means may comprise a spring. Preferably, the spring is conductive and abuts, at its end opposite the brush, against a contact for the supply of electrical power. Preferably, the spring coil and contact are held in the holder by a movable end cap for permitting removal and replacement of the brush.

According to another aspect of the invention, there is provided an electric motor or generator having a commutator and at least one brush assembly according to the invention arranged so that the or each brush contacts the commutator.

The motor or generator may comprise an AC motor and may have a series-connected field winding.

Figure 1:
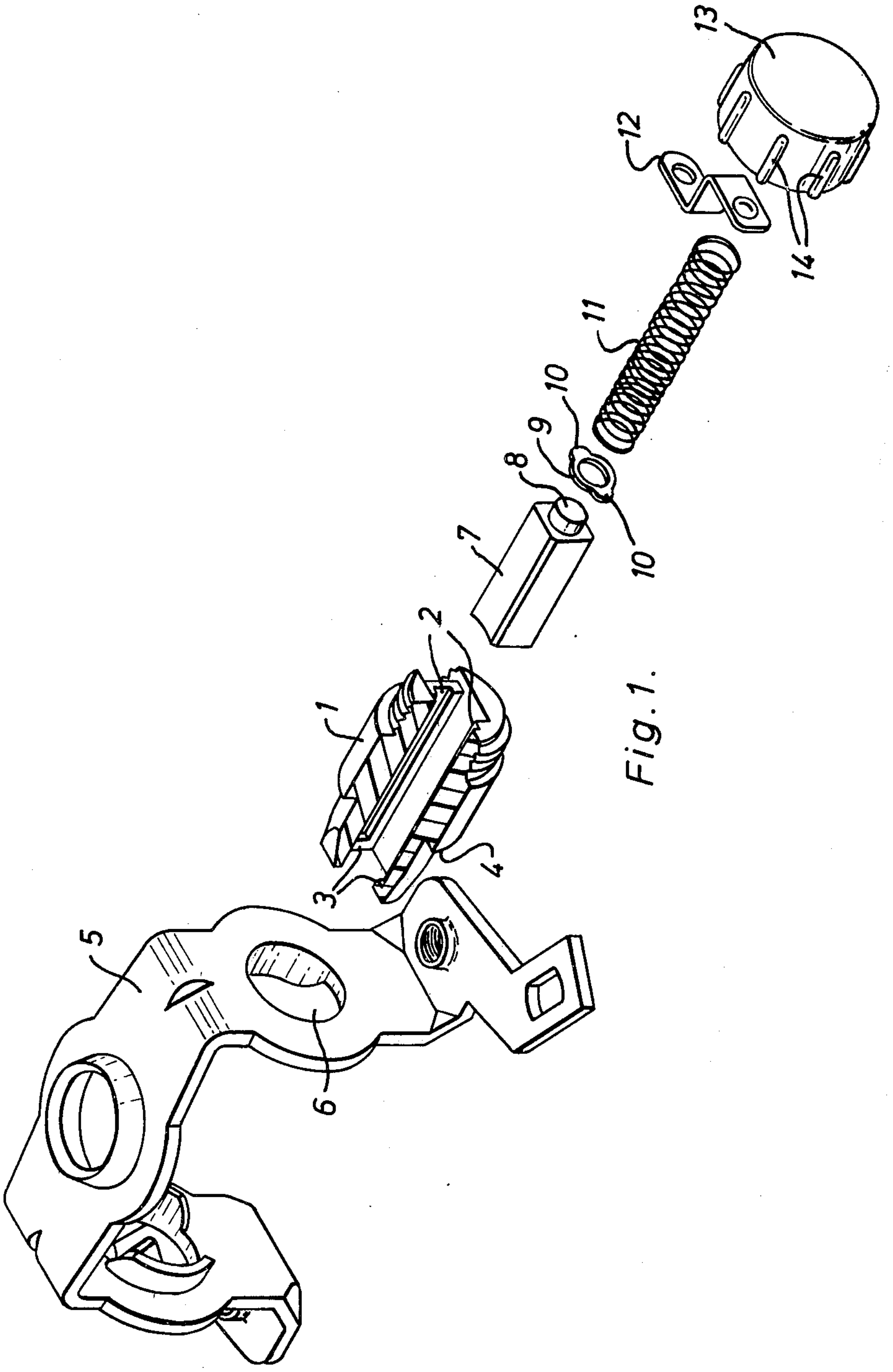
Figure 2:
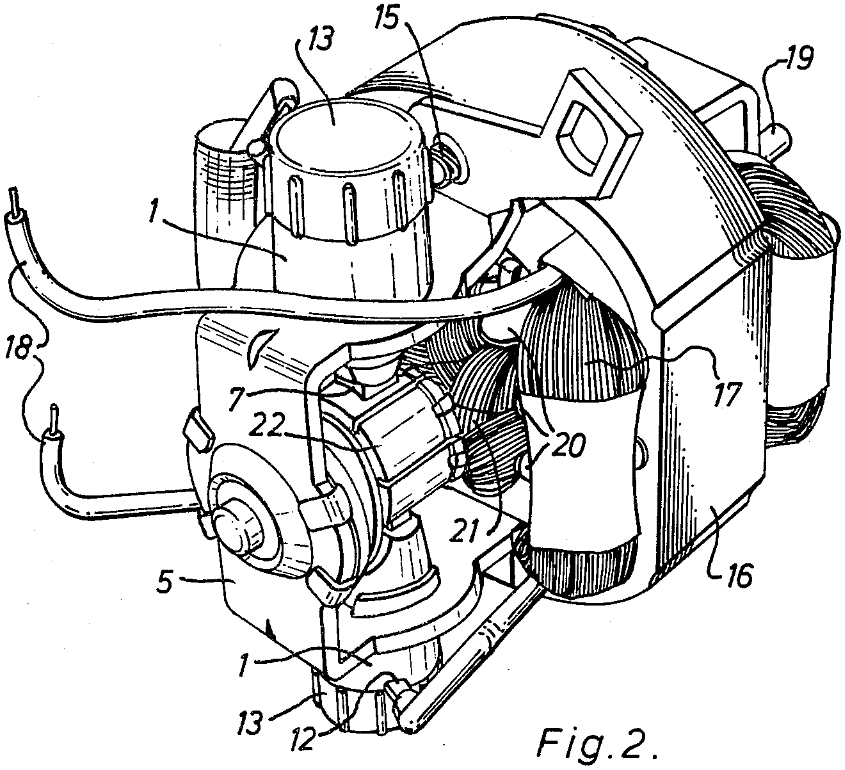

The invention will be further described, by way of example, with reference to the accompanying drawings, in which, FIG. 1 is an exploded perspective view of a brush assembly constituting a preferred embodiment of the present invention; and FIG. 2 is a perspective view of an AC motor including two of the brush assemblies shown in FIG. 1.

The brush assembly shown in FIG. 1 comprises a holder 1 having a through bore of substantially square cross section. Longitudinally extending slots 2 are formed in opposite sides of the through bore in the holder 1. The slots 2 extend to one end of the holder 1 but terminate at the other end of the holder at portion 3.

The holder 1 has a shoulder 4 and is mounted in a part 5 of the frame of an electric motor, the front part of the holder 1 passing through a bore 6 in the part 5 and the shoulder 4 resting against the edge thereof. The holder 1 is rigidly fixed to the part 5.

A carbon brush 7 has a substantially square cross section with chamfered longitudinal edges and is just smaller than the through bore of the holder 1 so as to be slidable there through. The brush 7 has a cylindrical protrusion 8 at its end opposite that which, in use, contacts a commutator of the motor. A washer 9 is disposed over the protrusion 8 and has two diametrically opposed ears 10 extending laterally therefrom. The washer 9 with the ears 10 is a slidable fit in the through bore of the holder 1 with the ears 10 being slidable along the slots 2 but being retained by the portion 3 of the holder.

A coil spring 11 has a first end which abuts against the washer 9 and a second end which abuts against a contact 12. The spring 11 and the contact 12 are retained in the holder 1 by means of a screw cap 13 which can be screwed onto threads provided on the outer surface of the holder 1. A plurality of longitudinal projections 14 are formed in the outer curved surface of the cap 13 to provide a finger grip for allowing the cap 13 to be removed for the purpose of removing and replacing the carbon brush 7 by hand.

FIG. 2 shows two of the brush assemblies shown in FIG. 1 mounted on an AC motor of the "series-wound" or series-connected field winding type. The frame 5 is fixed by means of bolts 15 to a laminated stator pole piece assembly 16. Two stator or field windings 17 (only one of which is shown) are provided on the two pole pieces of the assembly 16. One end of each field winding 17 is connected to the contact 12 of a respective one of the brush assemblies and the other end of each field winding constitutes a current input connection 18 of the electric motor.

The motor has a shaft 19 to which are fixed a plurality of rotor pole pieces 20. A plurality of rotor windings 21 are wound around the pole pieces 20 and are connected to the segments of a commutator 22 fixed to the shaft 19. The brushes 7 protrude from their respective holders 1 of the brush assemblies and contact the commutator 22 at diametrically opposite positions thereof.

In use, electric current is supplied to the motor by the connections 18. The electric current passes through the field windings 17 and, via the contact 12, the springs 11, the washers 9, which are made of metal, the carbon brushes 7, and the commutator 22, through the rotor windings 21 of the motor. Rotation of the commutator 22 on the shaft 19 causes the gradual wearing away of the carbon brushes, which are urged against the commutator by the springs 11 via the washers 9. As the carbon brushes 7 are worn away, they are pushed further out of the holder 1 so as to maintain contact with the commutator 22. Eventually, when the carbon brushes 7 are substantially completely worn away, the ears 10 of the washer 9 come into abutment with the parts 3 of the holders 1 which terminate the slots 2. This prevents further urging of the brushes 7 towards the commutator by the springs 11 and also prevents the ends of the springs 11 from coming out of the holder 1 and contacting the commutator 22. The screw caps 13 may then be unscrewed and the washer 9, the spring 11, and the contact 12 removed so as to allow the worn brush 7 to be replaced by a new brush.

The possibility of the springs 11 coming into contact with the commutator 22 is thus prevented by the abutment of the washer 9 with the ears 10 against the parts 3 of the holder 1 of each brush assembly. The spring 11 may therefore be made sufficiently strong to ensure that the brush 7 is urged against the commutator 22 through out its working life with sufficient force to maintain good contact therebetween.

I claim:

1. A brush assembly for one of an electric motor and an electric generator, comprising a brush having a first end for contacting a commutator of the one of the motor and the generator and a second end, a holder for said brush, a contact for connection to a supply of electrical power, conductive restraining means disposed at said second end of said brush, and a conductive spring having a first end which abuts against said restraining means and a second end which abuts against said contact, whereby said spring urges said brush against the commutator, said restraining means prevents said first end of said spring from contacting the commutator when said brush has worn away, and said spring and said restraining means provide a conductive path between said contact and said brush.

2. An assembly as set forth in claim 1, wherein said holder has an edge defining an opening, and wherein said restraining means comprises a washer interposed between said brush and said resilient means and arranged, when said brush has worn away, to abut against said edge of said holder through which said brush is urged.

3. An assembly as set forth in claim 2, wherein said washer is annular and has diametrically opposite ears extending outwardly therefrom so as to abut against said edge defining said opening when said brush has worn away.

4. An assembly as set forth in claim 3, wherein said brush is of substantially square cross section and has a cylindrical protrusion extending from one end through said washer.

* * * * *